United States Patent Office 3,148,321
Patented Sept. 8, 1964

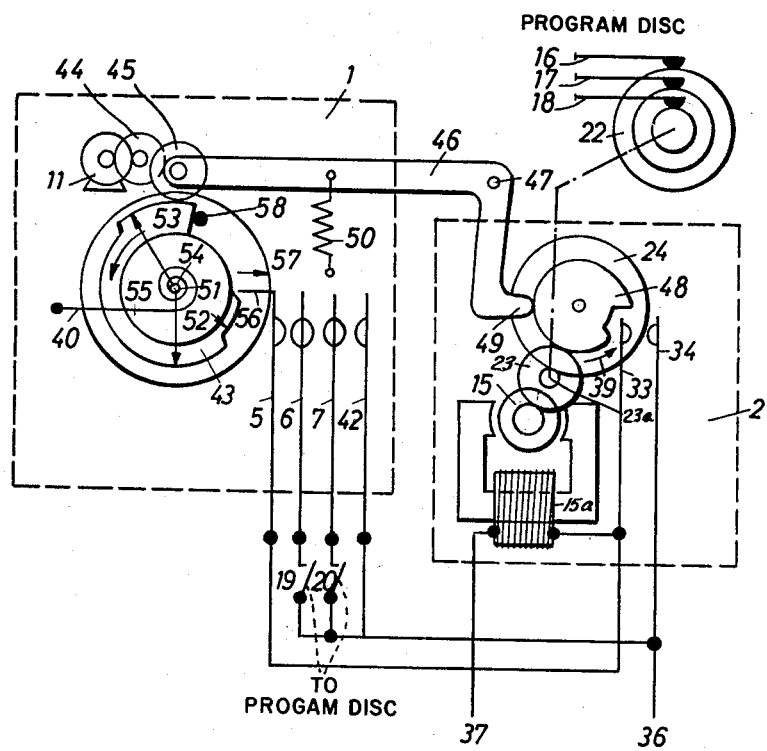

3,148,321
INTERMITTENT MOTOR CONTROL SYSTEM TO DRIVE PROGRAM DISK
Walter Holzer, Meersburg (Bodensee), Germany
Filed Apr. 12, 1960, Ser. No. 21,630
Claims priority, application Germany June 15, 1959
5 Claims. (Cl. 318—486)

The present invention relates to a timer operated step switching device in a program control apparatus for automatic washing machines.

It is an object of the present invention to provide a timer device which selectively assigns various periods of time to various program sections of a washing machine program control device.

It is a further object of the invention to provide short as well as long switching times within a program cycle.

It is another object of the invention to provide for the possibility to change the program itself without changing the control. It should also be possible to change entire sections of the controlling program by corresponding preselection of what sections are to be changed.

It is a further object of the invention that precise program control is being made available, capable of handling a large variety of programs at low cost and small space requirements. The control apparatus must be reliable and work faultlessly even in case of heavy shocks, voltage changes and a high humidity. Such hard operating conditions are especially found in laundering and dish washing machines.

According to one aspect of the present invention, in a preferred embodiment thereof, it is suggested to provide a rotatable timer having a starting and a plurality of operating positions. Means such as a motor are provided to drive the timer through a mechanical linkage including, for example, a displaceable gear wheel which can be displaced so as to interrupt the driving connection between the timer proper and its driving means. The operating positions of the timer each define a starting circuit for a step switching device which device is provided with means for self-interruption. A cam rotates with the step switching device and acts upon a lever which in turn acts upon the linkage mentioned above for displacing the gear. The timer is provided with recoiling means for returning it into the timer zero or starting position whenever the aforesaid driving connection is being interrupted.

It is a further feature of the invention, that the step switching device drives a program control element which in turn preselects which one of the operating positions of the timer shall next be effective.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which is shown schematically an embodiment of the invention.

Proceeding now with the detailed description of the drawing, the elements enclosed by dashed box 1 constitute a timer, while the elements enclosed in dashed box 2 constitute a step switching device.

The timer 1 comprises a motor 11, driving a gear 44 which in turn meshes with a pinion 45. A cam disc 43 is provided with suitable gearing to mesh with pinion 45. Thus, in the illustrated position motor 11 drives cam disc 43.

Pinion 45 is mounted at one end of a lever 46 having a pivot 47. The other arm of lever 46 is provided with a lug or projection 49 engaging the circumference of a trip cam disc 48. A spring 50 engages the arm carrying pinion 45 urging the lever so that lug 49 in fact engages disc 48 and that also pinion 45 meshes with disc 43. As will be described below more fully, the trip cam disc 48 upon rotation urges lever 46 to pivot in clockwise direction, against the tension of spring 50 whereby pinion 45 disengages from the gear of cam disc 43.

Cam disc 43 is provided with circumferential scanning surfaces of increasing radius designated by reference numerals 51, 52, and 53, measured from axis of rotation 54 of disc 43. These surfaces are scanned by a feeler 56 shown as resting in its lower most position. When disc 43 rotates in the direction of arrow 55, feeler 56 is moved stepwise in direction of arrow 57. Whenever the feeler tip is lifted from one scanning surface to the next one of disc 43, a series of contacts is being closed successively.

There are provided a plurality of contact blades 5, 6, 7 and 42 closing successively upon rotation of disc 43. In particular, contacts 5 and 6 will close when feeler 56 is lifted so as to scan the surface with radius 51. After disc 43 has rotated by a distance determined by the circumferential length of the scanning surface with radius 51, feeler 56 is lifted to now engage the surface with radius 52 whereupon contacts 6 and 7 close, contacts 5 and 6 of course remain closed. After still further rotation feeler 56 is lifted upon the surface with radius 53 whereupon contacts 7 and 42 close, with contacts 5-6 and 6-7 remaining closed.

A recoiling spring 40 is provided so as to be tensioned whenever disc 43 is rotated in direction of arrow 55. When pinion 45 disengages from disc 43, the spring 40 recoils the disc until stopped by stop 58. This then defines the zero position of the timer.

Proceeding now to the step switching device 2, there is first a motor 15 geared to program control disc 22 in a suitable and conventional manner and including gears 23, 23a, 24 and shaft 31. Program control disc 22 can be of the type as described in my copending Patent 3,032,617 having a plurality of concentrical cam tracks. United States Letters Patents 2,055,031, 2,842,627, and 2,703,347 show other suitable control discs with concentrical cam tracks. As indicated schematically there are program contacts 16, 17 and 18 for governing switching operations in the washing machine controlled by the apparatus of the invention. The program control disc 22 further governs two contacts 19 and 20, which are respectively connected in series with contacts 6 and 7.

As shown in the drawing, the cam disc 48 mentioned above is driven by gear wheel 23a, consequently cam 48 rotates faster than disc 22. Cam 48 engages, as mentioned above, lug 49 for pivoting lever 46. Cam 48 also governs contacts 33 and 34. The field winding 15a of motor 15 is connected to voltage source terminals 36 and 37 as follows: one side of winding 15a is directly connected to terminal 37 while the other side is connected to terminal 36 via contacts 33 and 34 when closed. Alternatively this other side of winding 15a connects to terminal 36 through contact 5 and contact 6 (when 19 is closed), or contact 7, when contact 20 is closed, or contact 42. The energizing circuit for motor 15 and particularly its field winding 15a, which includes contact 5 and at least one of the contacts 6, 7 and 42 constitutes a control circuit for starting the motor 15, whereas cam operated contacts 33 and 34 constitute a holding and self-interrupting circuit for motor 15.

It is thus apparent, that the aforedescribed device defines the following apparatus: a first motor 11; a first cam disc 43; a train of gear wheels 44, 45 for rotatably interconnecting said motor and said cam disc and including a gear wheel 45 capable of being disengaged from said train of gear wheels, thus interrupting the connection between motor 11 and disc 43; a second electric motor 15; a plurality of contact blades 5, 6, 7, 42 operated upon by said cam disc 43 and placed in circuit with said second motor 15 for governing the power supply thereto; a second cam disc 48 drivingly connected to said second motor 15; contact means 33, 34 also in circuit with said second motor 15 for governing the power supply thereto independent from said plurality of contact blades 5, 6, 7, 42 and operated upon by said second cam disc 48 so as to close said contact means 33, 34 after said second motor 15 has been started via at least two of said contact blades 5, 6, 7, 42; recoiling means 40 for said first disc 43 for returning it into a starting position in which all of said contact blades are open (this position is shown in the drawing); and a lever 46 engaging said second disc 48 and pivotally supporting said disengageable gear wheel 45 for lifting the latter from said train in dependence upon rotation of said second motor 15, said second cam disc 48 causing re-engagement of said wheel 45 when said contact means 33, 34 have been opened.

In the initial position, the contacts are as indicated in the drawing, if contacts 5, 6, 7 and 42 are all open, so are contacts 33 and 34. The timer is as shown in timer zero position as defined by stop 58. Pinion 45 meshes with both, gear 44 and the tooth gear of disc 43. Program disc 22 may be in any position and the particular position of contacts 16, 17 and 18 is immaterial. It may also be assumed that contacts 19 and 20 are both open. The field winding 15a is disconnected from source terminal 36 and thus this motor is at rest.

Since motor 11 is assumed running, disc 43 is rotated out of the timer-zero-position and contacts 5–6 close. Since contact 19 is open, no starter circuit is present for motor 15 which thus remains at rest. Disc 43 continues to rotate until feeler 56 is shifted again in direction of arrow 57 due to cam surface with radius 52 coming into the reach of the feeler. Consequently, contacts 6–7 close, but since contact 20 is open, nothing further happens for the motor 15. When finally cam surface with radius 53 shifts feeler 56 still further, contacts 7–42 close so that there is a closed contact position 5–6–7–42.

The moment of starting is determined by the time elapsed from the reeling of disc 43 out of zero position to the engagement of feeler 56 with cam surface of radius 53. The closing of contacts 7–42 cause motor 15 to be energized and it starts to run driving both, cam 48 and program disc 22.

The cutout of cam 48 is very small, so that soon after motor 15 has started, contacts 33 and 34 close and take over for current conduction to motor 15. In other words, independent from the contacts 5, 6, 7 and 42 as well as 19 and 20, motor 15 receives current through the now closed contacts 33 and 34. Upon further rotation of cam 48, lug 49 is urged in clockwise direction against the tension of spring 50, thus lifting pinion 45 from disc 43. Accordingly, the driving connection from motor 11 to disc 43 is interrupted and spring 40 recoils the disc back into timer zero position whereby all contact connections 5–6–7–42 are opened in the inverse succession of their closing.

When the cutout of cam 48 reaches again contacts 33–34, these contacts open and thus interrupt the supply circuit for motor 15 which thus comes to rest after a complete revolution of cam 48 which defines one step. In the meantime, lug 49 also did drop into the cutout of trip cam 48 under the influence of spring 50 so that pinion 45 re-engages with disc 43. Also in the meantime, i.e. still during rotation of motor 15 by one step as defined by a complete revolution of cam 48, disc 22 did also rotate by one step whereby some or all of the previous positions of contacts 16 to 20 are changed.

When motor 15 comes to rest as aforedescribed, program disc 22 is in a new operating position, while the timer will start anew.

Assuming now, that contact 20 has been closed, then the disc 43 will be rotated until the cam surface with radius 52 closes contacts 6–7 (contacts 5–6 of course were closed somewhat before). Now a starting circuit from motor 15 is defined via the closed contacts 5–6–7 and 20, and motor 15 starts to run as aforedescribed, performs one step and comes at rest again, while timer disc 43 was being recoiled.

Depending upon relative adjustment and positioning of contacts 33 and 34 relative to the cutout of cam disc 48, they may close either immediately after motor 15 has been started, or slightly thereafter.

It will be understood, that there is thus defined an alternating operation of timer 1 and of step switching device 2, whereby the timer 1 determines when the motor 15 is to be started and, in fact, starts the same, while step switching device 2 moves program disc 22 stepwise and the program disc 22 itself determines the length of the then following time interval. This, of course, is done by closing or opening contacts 19 and/or 20.

The device incorporates an inherent safety feature in that the timer will always start motor 15 after the longest time interval has elapsed, i.e. after contacts 7–42 have closed. Hence, continuation of the program is ensured even if for some reason contact 19 or 20 did not close when they should have. This is also important if, for example, pursuant to a particular program portion a succeeding washing program step is not timer controlled, but, for example, temperature or level controlled. In this case the timer is set to yield its longest interval, i.e. contacts 19 and 20 will be open. Suppose the thermostat is faulty, overheating will not occur, since at any rate the next step will be started by the timer via contacts 42 even if the thermostat, which should have started motor 15 for the next step failed to do so.

The aforedescribed cooperation of timer and step switching device has many advantages. The timer returns into its zero or starting position after every step. Thus, timer operation permits production of very accurate time intervals of short as well as long duration, since every time interval is started anew and taken from the timer zero position.

The self-interrupting device operating with a starting of motor 15 and an automatic stopping thereof after a definite step ensures that every step is started anew from a definite zero position which is determined by the relative position of cutout of cam 48 and contacts 33 and 34. Thus, in any instance, timer as well as step switching device return to their respective zero position out of which they then start anew. Accordingly, errors are not being added up.

The embodiment of the invention can also be understood with regard to the following modification. In lieu of motor 15, one can use a continuously running motor and the field winding 15a then pertains to an electromagnetic coupling controlling a driving connection between such a motor and gear 23a, 23 etc. It will be appreciated, that the number of time intervals available is not limited to those shown in the drawing.

The invention is not limited to the embodiments described above but all changes and modifications thereof not constituting departments from the spirit and scope of the invention are intended to be covered by the following claims.

I claim:

1. A timer device for automatic washing machines comprising: a first motor; a first cam disc; a train of gear wheels for rotatably interconnecting said motor and said cam disc and including a gear wheel capable of being disengaged from the train of gear wheels thus interrupting the connection between motor and disc; a second electric motor; a plurality of contact blades operated upon by said cam disc and placed in circuit with said second motor for governing the power supply thereto; a second cam disc drivingly connected to said second motor; contact means also in circuit with said second motor for governing the power supply thereto independent from said contact blades and operated upon by said second cam disc so as to close said contact means after said second motor has been started via at least two of said contact blades; recoiling means for said first disc for returning it to a starting position in which all of said contact blades have been opened; and a lever engaging said second disc and pivotally supporting said disengageable gear wheel for lifting the latter from said train in dependence upon rotation of said second motor, said second cam disc causing re-engagement of said wheel via said lever when said contact means have been opened.

2. A control device for automatic washing machines the combination comprising: a motor driven timer including a mechanical coupling governing activation and de-activation thereof and further including means for returning said timer to its starting position when said coupling is opened; an electric motor; a control circuit for starting said motor in response to said timer; a trip cam driven by said electric motor; a pair of contacts operated upon by said trip cam for stopping said motor; and a spring-biased lever operated upon by said cam and connected to said coupling, said coupling being closed.

3. A timer device for automatic washing machines comprising: a first motor; a first cam disc having cams of different radii, said radii changing in steps in azimuthal direction; a plurality of stationary contacts cooperating with said cams for successively closing them in response to the angular position of said cams of decreasing radii; selector contacts in circuit with said stationary contacts; a train of gear wheels for rotatably interconnecting said motor and said cam disc and including a gear wheel capable of being disengaged from the train of gear wheels thus interrupting the connection between motor and disc; a self-interrupting rotating step switching device started by said contacts and having a second cam disc; and a lever deflectively actuated by said second cam disc and actuating upon said gear wheel for disengaging it from said train.

4. Device as set forth in claim 3, one stationary contact being directly in circuit with said step switching device independent from any selector contact.

5. In a control apparatus for automatic machines, the combination comprising: a rotatable timer having a starting and a plurality of operating positions, means for driving said timer; a mechanical linkage for coupling said timer to said driving means; a self-interrupting step switching device started by said timer when in a preselected one of said operating positions; a cam rotated by said step switching device, a lever actuated by said cam for interrupting said linkage, and means for returning said timer into its starting position when said linkage is interrupted.

References Cited in the file of this patent
UNITED STATES PATENTS

| | | |
|---|---|---|
| 2,478,407 | Lean | Aug. 9, 1949 |
| 2,848,630 | McNicol et al. | Aug. 19, 1958 |